United States Patent
Hamel

[15] 3,655,456
[45] Apr. 11, 1972

[54] DRY CELL BATTERY
[72] Inventor: David O. Hamel, Madison, Wis.
[73] Assignee: ESB Incorporated
[22] Filed: June 15, 1970
[21] Appl. No.: 46,429

[52] U.S. Cl. ............................................136/181, 136/135
[51] Int. Cl. ...........................................................H01m 5/04
[58] Field of Search .......................... 136/111, 132, 135, 181

[56] References Cited

UNITED STATES PATENTS

| 3,440,105 | 4/1969 | Yamamoto et al. | 136/111 |
| 1,118,121 | 11/1914 | Gillingham | 136/181 |
| 1,168,078 | 1/1916 | Jefferson | 136/181 |
| 1,303,558 | 5/1919 | Hipwell | 136/132 |
| 2,070,426 | 2/1937 | Faber | 136/132 |

FOREIGN PATENTS OR APPLICATIONS 967,418   8/1964   Great Britain .........................136/132

Primary Examiner—Donald L. Walton
Attorney—Alfred J. Snyder, Jr., Robert H. Robinson, Raymond L. Balfour and Anthony J. Rossi

[57] ABSTRACT

A dry cell battery is described characterized by having a terminal board with one or more electrical terminals mounted thereon and a terminal protector adhesively fastened to the terminal board.

3 Claims, 7 Drawing Figures

PATENTED APR 11 1972 3,655,456

INVENTOR.
David O. Hamel

PATENTED APR 11 1972 3,655,456

INVENTOR.
David O. Hamel

DRY CELL BATTERY

BACKGROUND OF THE INVENTION

1. Field of the Invention

This invention relates to dry cell batteries of the type having electrical terminals mounted on a terminal board and, in particular, to a seal or protector for the terminals.

2. Description of the Prior Art

The desirability of having a terminal protector or guarantee strip on dry cells to prevent accidental battery discharge prior to sale and to insure that the customer receives a fresh and unused product has long been recognized by dry cell manufacturers.

To be truly effective, a terminal protector must be locked into the cell assembly in such a manner that any tampering with the protector would be noticeable to the purchaser. It also must be permanent in the sense that it will not be removed in normal pre-sale handling of the battery, however, it must be readily removeable by the user.

There is a class of dry cell battery having a terminal board to which the battery terminals are fastened. Although the usual number of terminals for such dry cell batteries is two, special batteries may have from one to four or more terminal contacts. In such batteries, it is customary to use a metal jacket to contain the battery assembly. In the past, terminal protectors have been applied to these batteries in the form of a strip of insulating material placed across the terminals with the ends of the strip being secured between a lip, formed as part of the metal jacket, and the terminal board. Unfortunately, it appears to be a characteristic of this class of battery that the lip of the metal jacket does not bear very tightly on a so-placed terminal strip with the result that the terminal protector is not firmly held and can be easily displaced. If this occurs, it will be to the detriment of the battery supplier as well as the user. Further, during the assembly of this class of battery, the metal jacket, the terminal strip, certain pieces of insulating material, the several cells of the battery and the bottom board must all be fitted together and placed in a fixture so that the final closing operation can be performed. This already complicated assembly is even more difficult when it is required to accurately place a loose ribbon or strip of material over the battery terminals and hold it there until the closure has been made. Because of the difficulty of attaching a terminal protector to a dry cell having a terminal board, it is usual practice at the present time to sell terminal board type dry cell batteries without any protector at all in contrast with many other classes of cell, as for example the ordinary D-cells, which are sold with protectors by many suppliers.

SUMMARY OF THE INVENTION

Briefly, and in accordance with the invention, a dry cell battery of the type having an insulated terminal board and one or more battery terminals fastened thereto is supplied with a terminal protector. The terminal protector is characterized by being fastened directly to the terminal board, the terminal protector being fastened to the terminal board prior to the final cell assembly operation thus assuring its permanent and accurate location.

DESCRIPTION OF THE PREFERRED EMBODIMENTS

Throughout this description the same identification numbers are used for like parts in the several figures.

Figure 1:
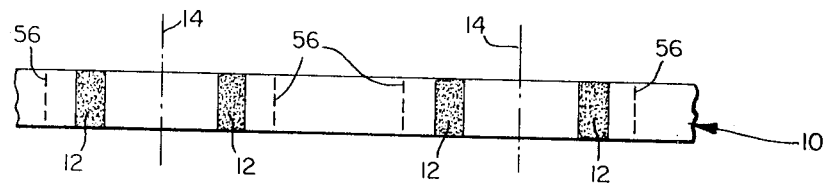
In FIG. 1 a strip of insulating material suitable for use as a terminal protector with adhesive thereon is shown.

In FIG. 1 there is shown at 10 an elongated tape of paper or plastic film. Adhesive material is applied to selected locations 12 on one side of this ribbon.

Many adhesive types can be used for this application. The principal types will be found among solvent dispersed, pressure sensitive, hot melt and thermoset materials. The choice will depend upon the material to which the tape will be adhered, the method chosen to perform the fastening step and the time available for the setting of the adhesive after application. The other side of the ribbon (not shown) may be suitable imprinted with removal instructions and brand or other advertising display. It is indicated by dotted lines 14 that the ribbon 10 is cut to length, as will be described below, to form each terminal protector.

Figure 2:
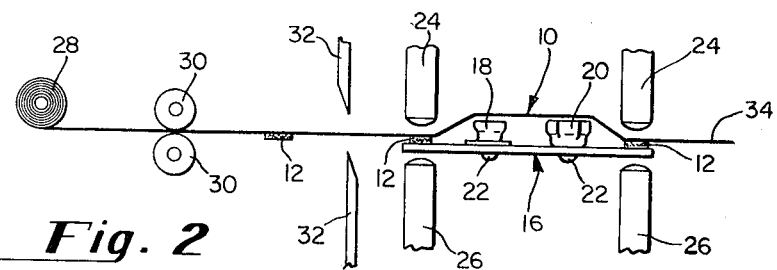
FIG. 2 shows a view of the operation of applying the protector to a typical terminal board.

FIG. 2 shows in outline form the operation of fastening the terminal protector tape 10 to a typical battery terminal board 16 to provide a protective covering to the terminals 18 and 20. The positive terminal 18 and negative terminal 20 are mounted to the board 16 by rivets 22. Two moveable heated jaws 24 press the tape 10 onto the board 16 and against fixed jaws 26. The tape 10, fed from coil 28 by rollers 30 is positioned to locate the adhesive spots 12, 12 under the heated jaws 24. A shear arrangement shown as 32 is provided to sever the tape 10 from the feed roll 28. In some cases, it may be desirable to allow the tape 10 to extend beyond the edges of the terminal board 16 as shown at 34.

Figure 3:
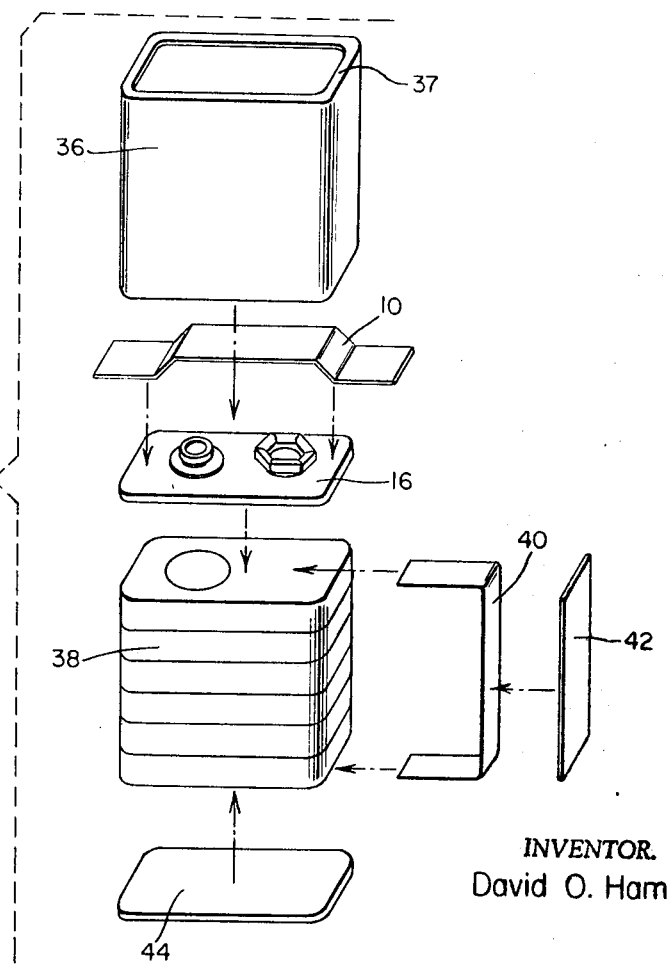
FIG. 3 is an exploded view showing the components of a typical multicell battery of the type using a terminal board prior to final battery assembly.

FIG. 3 shows the several parts of the battery ready for assembly into an outer battery sleeve 36. This sleeve is provided with a flange 37. The terminal board 16 with terminal protector 10 attached thereto is pushed into sleeve 36 until it rests against flange 37. This is followed by a cell pack 38, internal end cell conductor 40 and conductor insulator 42. The bottom board 44 is located and then the whole assembly is placed in a press where the bottom edge of the sleeve 36 is crimped around the bottom board 44 to complete the battery.

Figure 4:
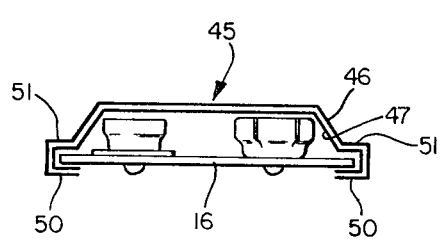
FIG. 4 portrays a terminal board with protector strip fastened to the bottom thereof in accordance with a modification of the invention.

In an alternate embodiment of the invention, the terminal protector tape is a paper-plastic laminate in which the plastic material is such as polyethylene, polyethylene co-polymer, polyvinyl resins or other resinous coating material. By placing the plastic side of the laminate toward the terminals, two improvements over a paper protector are achieved. First, a paper strip, under adverse conditions, may pick up moisture and so present a slight but at times significant conductive path across the battery terminals. With a plastic coating touching the terminals, this cannot occur. Second, by a proper choice of plastic, the plastic itself can be used as the adhesive for attaching the protective tape to the terminal board. Alternately, a tape of solid plastic can be used for the protector at a somewhat greater cost. The tape 45 shown in FIG. 4 illustrates a laminate comprising a paper outer layer 46 and a plastic inner layer 47.

In a second alternate embodiment, the protective tape is brought around the ends of the terminal board and adhered to the underside of or in addition to the top of the board. This is advantageous in that the underside of the board may be less glazed and so will provide a better surface for the adhesion of the protective tape. FIG. 4 is a side view of terminal board 16 with protective tape 45 fastened to it on its underside at 50 as well as its top at 51.

In a third alternate, one end of the protective tape is left long enough to serve as insulating member for the internal end cell conductor. An assembly illustrating this embodiment is shown in FIG. 5.

Figure 5:
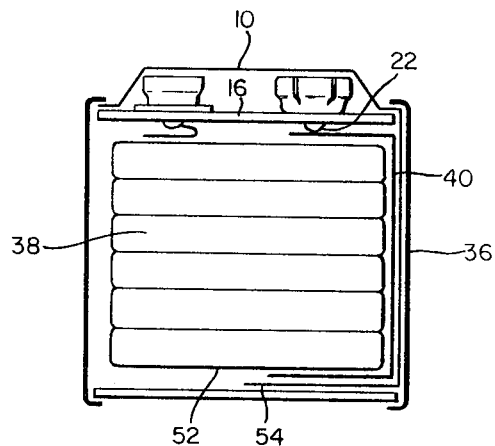
FIG. 5 is a sectional view of a battery having a combined terminal protector and internal end cell conductor insulator in accordance with a further modification of the invention.

In FIG. 5, a single insulating terminal protector and end cell conductor insulating member 10 is shown having a first end 54 overlapping a first end of the end cell conductor 40. A portion of the protector and insulating member 10 is positioned between the end cell conductor 40 and the metallic outer container 36, a further portion of the protector and insulating member 10 passes over the terminal board 16 and the one or more terminals mounted thereon (18 and 20, FIG. 2) to a second end of the protector and insulating member, the second end being adhesively attached to the terminal board 16.

In FIG. 5, the internal end cell conductor 40 is shown connecting the negative end 52 of the battery pack 38 to the negative terminal rivet 22. Tail 54 to the terminal protective tape 10 is shown brought down parallel to conductor 40 and between conductor 40 and outer battery sleeve 36. By this means, the loose insulator piece 42 shown in FIG. 3 is eliminated, thereby further simplifying the battery assembly operation.

It should be pointed out that the material from which the protective tape is made should be comparatively weak so that it can be readily removed when the battery is put in use. To this end, it may be desirable to weaken the tape by punching or scoring it near its point of attachment to the terminal board. In the case of the laminated tape, the heat sealing operation may serve to weaken the tape to a desirable degree. In FIG. 1, score lines are shown at 56.

Figure 7:
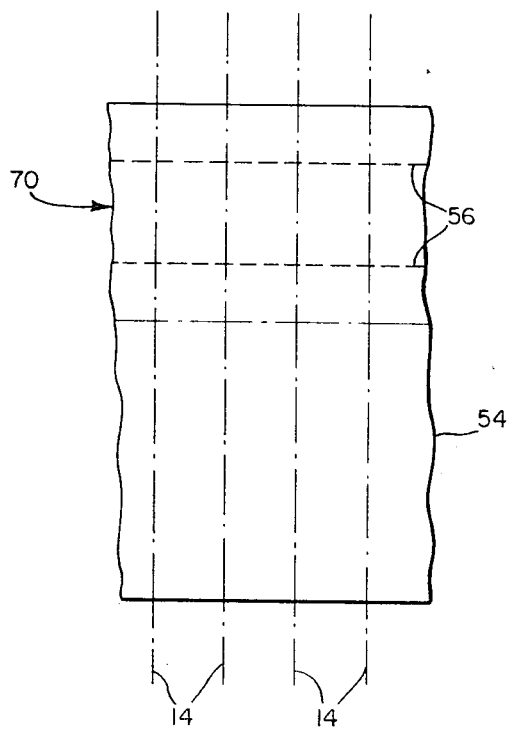
FIG. 7 is a second alternate form of the insulating strip.
Figure 6:
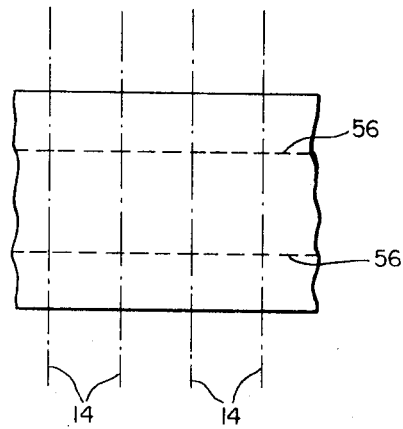
FIG. 6 is an alternate form of the insulating material for use as a terminal protector.

An alternate form of tape is shown in FIG. 6. In this case, the width of the tape is equal to the length of the final terminal protector. In the tape of FIG. 6, the portions outside of the score lines 56 have been coated with adhesive. The obverse of the tape may contain removal instructions, etc. FIG. 7 shows a second alternate form of the tape 70, adapted to be used in the construction shown in FIG. 5. Tape 70 has score marks 56. The lines 14 show where the tape will be cut. 54 represents the long tail of the protector to be used to insulate the terminal end cell. conductor. In this example, the adhesive has been placed on the terminal board so that there need be no adhesive on the tape itself. It will be apparent that a protector application device for this type of ribbon, while similar in operation to that shown in FIG. 2, must feed the ribbon in a direction at right angles with respect to the terminal board to the direction of feed shown in FIG. 2.

Having thus fully described my invention, I claim:

1. A dry cell battery which comprises:
    a. a metallic outer container;
    b. a cell pack located within the outer container;
    c. a terminal board located at one end of the cell pack having at least one terminal mounted thereon;
    d. an internal end cell conductor located within the metallic outer container between the container and the cell pack, the conductor having a first end distant from the terminal board and electrically connected with a terminal end of the cell pack and a second end electrically connected to a terminal on the terminal board; and
    e. a single insulating terminal protector and end cell conductor insulating member having a first end overlapping the first end of the end cell conductor, a portion of the protector and insulating member positioned between the end cell conductor and the metallic outer container, a further portion passing over the terminal board and over the one or more terminals thereon to a second end of the protector and insulating member, the second end of the insulating terminal protector and end cell conductor insulating member being adhesively attached to the terminal board.

2. A battery as defined in claim 1 in which the insulating member is a paper-plastic laminate.

3. A battery as defined in claim 1 in which the insulating member is a plastic film.

* * * * *